United States Patent Office 3,257,431
Patented June 21, 1966

3,257,431
DICHLORO AND DIFLUOROACETATES OF SUB-
STITUTED TESTOSTERONE DERIVATIVES
Fred A. Kincl, Atherton, Calif., assignor to Syntex Corporation, Panama, Panama, a corporation of Panama
No Drawing. Filed Oct. 4, 1963, Ser. No. 313,777
14 Claims. (Cl. 260—397.4)

This invention relates to novel cyclopentanophenanthrene derivatives and to processes for their preparation. More particularly, this invention relates to novel 17-dihaloacetate esters of 17β-hydroxyandrostane derivatives, such as those compounds represented by the general formula:

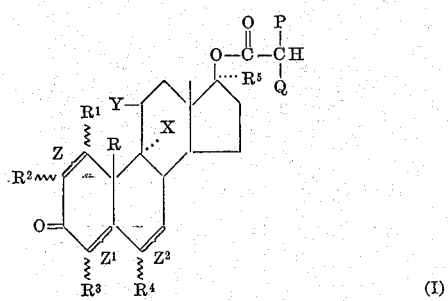

In the above formula R and $R^1$ each represent hydrogen or methyl; $R^2$ represents hydrogen, methyl or a cyano group; $R^3$ and $R^4$ each represent hydrogen, methyl, fluorine or chlorine, with no more than one of $R^2$, $R^3$ and $R^4$ being other than hydrogen; $R^5$ represents hydrogen, a lower alkyl group, e.g., methyl, a lower alkenyl group, e.g., vinyl, or a lower alkinyl group, e.g., ethinyl; X represents hydrogen, fluorine or chlorine, and Y represents hydrogen, a β-hydroxyl group or a keto group, with X being hydrogen when Y is hydrogen; Z represents either a double bond or a saturated linkage between the carbon atoms at the 1- and 2-positions; $Z^1$ represents either a double bond or a saturated linkage between the carbon atoms at the 4- and 5-positions; $Z^2$ represents either a double bond or a saturated linkage between the carbon atoms at the 6- and 7-positions; the symbol ⸲ indicates that a substituent attached thereby to the steroid nucleus can be in either the α- or the β-configuration when there are saturated linkages between the carbon atoms to which it is attached and each of the carbon atoms adjacent thereto, and P and Q each represent either flourine or chlorine.

Compounds such as those represented by Formula I above are prepared by simply esterifying the free 17β-hydroxyl group in known 17β-hydroxyandrostane derivatives such as those represented by the general formula:

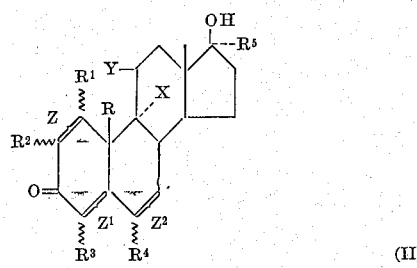

wherein R, $R^1$, $R^2$, $R^3$, $R^4$, $R^5$, X, Y, Z, $Z^1$ and $Z^2$ have the same meanings as set forth hereinabove for the Formula I, with a dihalo acetic acid, a dihalo acetyl halide or a dihalo acetic anhydride wherein two of the hydrogen atoms of the acetyl moiety are replaced by either fluoro or chloro atoms.

The present invention is based on the surprising and unexpected discovery that esterification of the 17β-hydroxyl group in these known 17β-hydroxyandrostane derivatives with the above-described dihaloacetyl groups potentiates their therapeutic activity, i.e., androgenic and anabolic activity in the case of 17α-unsubstituted and 17α-lower alkyl-substituted derivatives and progestational activity in the case of 17α-lower alkenyl or lower alkinyl-substituted derivatives, thus permitting them to be used orally or parenterally at low dosage levels at which the corresponding conventional 17-esters, e.g., the acetates, are no longer sufficiently active.

This esterification reaction, as previously indicated, can be carried out using either a free dihaloacetic acid, i.e., dichloroacetic acid, difluoroacetic acid or fluorochloroacetic acid, a corresponding acid halide, preferably the chloride, e.g., dichloroacetyl chloride and the like, or a dihaloacetic anhydride, e.g., dichloroacetic anhydride and the like. Several esterification procedures, all of which have been used in conventionally esterifying steroidal hydroxyl groups, are available. First of all, esterification can be carried out in an inert organic solvent, preferably pyridine, collidine, lutidine, and the like, as well as mixtures thereof with each other or with one or more other inert organic solvents, such as benzene, toluene, xylene, and the like, at a temperature ranging from room temperature (about 25° C.) or lower to reflux temperature for from about 30 minutes to about 15 hours or longer, using either a dihalo acetyl halide or a dihalo acetic anhydride. Secondly, esterification can also be accomplished in an inert organic solvent, such as benzene, toluene, xylene, and the like, as well as mixtures thereof, by using a free dihalo acetic acid or the anhydride thereof either alone or in the presence of a strongly acidic esterification catalyst, such as benzenesulfonic acid, p-toluenesulfonic acid, and the like. This latter esterification procedure will generally be carried out at reflux temperature for periods of time ranging up to about 15 hours or more, with provision being made for the continual removal of water formed during the reaction. The first of these procedures is generally preferred when esterifying 17β-hydroxy-17α-unsubstituted androstanes, and the second when esterifying 17β-hydroxy-17-substituted androstanes, although the latter can also be esterified by refluxing them in pyridine with a dihalo acetyl halide for periods of time ranging up to about 15 hours or more.

In working up the reaction mixtures obtained using the first and third of the above-described procedures, the reaction mixture is usually washed first with dilute aqueous hydrochloric acid and then with an aqueous solution of sodium carbonate, while in working up the reaction mixtures obtained using the second of these procedures, the hydrochloric acid wash is omitted. In either case, however, conventional evaporation, drying, crystallization and/or chromatography techniques can be employed to isolate the final products.

Whenever necessary, 17β-acyloxy androstanes which have been esterified at the 17β-position with conventional acyl groups, e.g., acetates, propionates, enanthates, and the like, can be deesterified by conventional procedures, e.g., by refluxing them with aqueous sodium hydroxide, potassium carbonate, and the like, in order to provide a free 17β-hydroxyl group which can then be reesterified with a dihaloacetyl group as described hereinabove.

An illustrative but by no means exhaustive listing of 17β-hydroxyandrostane derivatives coming within the scope of Formula II above which can be esterified according to the practice of the present invention includes 17α-unsubstituted compounds such as:
Androstan-17β-ol-3-one,
2α-methylandrostan-17β-ol-3-one,
4α-methylandrostan-17β-ol-3-one,
6β-methylandrostan-17β-ol-3-one,
19-norandrostan-17β-ol-3-one,
1α-methyl-19-norandrostan-17β-ol-3-one,
$\Delta^1$-androsten-17β-ol-3-one,
$\Delta^1$-androstene-11β,17β-diol-3-one,
$\Delta^1$-androsten-17β-ol-3,11-dion,
testosterone,
2α-methyltestosterone,
4-methyltestosterone,
6α-methyltestosterone,
6α-methyltestosterone,
4-fluorotestosterone,
4-chlorotestosterone,
6α-fluorotestosterone,
6β-fluorotestosterone,
2α-cyanotestosterone,
11β-hydroxytestosterone,
11-ketotestosterone,
6α-methyl-11β-hydroxytestosterone,
6α-methyl-11-ketotestosterone,
4-chloro-11β-hydroxytestosterone,
6α-fluoro-11β-hydroxytestosterone,
6β-fluoro-11β-hydroxytestosterone,
6α-fluoro-11-ketotestosterone,
6β-fluoro-11-ketotestosterone,
6α-chloro-11β-hydroxytestosterone,
9α-fluoro-11β-hydroxytestosterone,
9α-chloro-11β-hydroxytestosterone,
$\Delta^{1,4}$-androstadien-17β-ol-3-one,
4-chloro-$\Delta^{1,4}$-androstadien-17β-ol-3-one,
6α-fluoro-$\Delta^1$-androstadien-17β-ol-3-one,
2-cyano-$\Delta^{1,4}$-androstadien-17β-ol-3-one,
6α-methyl-$\Delta^{1,4}$-androstadien-17β-ol-3,11-dione,
6α-fluoro-$\Delta^{1,4}$-androstadiene-11β,17β-diol-3-one,
6α-fluoro-$\Delta^{1,4}$-androstadien-17β-ol-3,11-dione,
$\Delta^{4,6}$-androstadien-17β-ol-3-one,
4-chloro-$\Delta^{4,6}$-androstadien-17β-ol-3-one,
$\Delta^{4,6}$-androstadiene-11β,17β-diol-3-one,
9α-fluoro-$\Delta^{4,6}$-androstadiene-11β,17β-diol-3-one,
$\Delta^{1,4,6}$-androstatriene-11β,17β-diol-3-one,
9α-fluoro-$\Delta^{1,4,6}$-androstatriene-11β,17β-diol-3-one,
9α-fluoro-$\Delta^{1,4,6}$-androstatrien-17β-ol-3,11-dione,
19-nortestosterone,
1α-methyl-19-nortestosterone,
2α-methyl-19-nortestosterone,
4-methyl-19-nortestosterone,
4-chloro-19-nortestosterone,
11β-hydroxy-19-nortestosterone,
11-keto-19-nortestosterone,
19-nor-$\Delta^{4,6}$-androstadien-17β-ol-3,11-dione,
and the like, and 17α-substituted compounds such as:
17α-methylandrostan-17β-ol-3-one,
2α,17α-dimethylandrostan-17β-ol-3-one,
4α,17α-dimethylandrostan-17β-ol-3-one,
17α-methyl-5α-androstane-11β,17β-diol-3-one,
17α-methyl-5β-androstane-11β,17β-diol-3-one,
9α-fluoro-17α-methyl-5α-androstane-11β,17β-diol-3-one,
9α-fluoro-17α-methyl-5α-androstan-17β-ol-3,11-dione,
17α-methyl-19-norandrostan-17β-ol-3-one,
17α-ethyl-19-norandrostan-17β-ol-3-one,
17α-propyl-19-nor-5β-androstan-17β-ol-3-one,
17α-vinyl-19-norandrostan-17β-ol-3-one,
17α-ethinyl-19-norandrostan-17β-ol-3-one,
17α-methyl-19-nor-5α-androstane-11β,17β-diol-3-one,
9α-fluoro-17α-methyl-19-nor-5α-androstane-11β,17β-diol-3-one,
9α-fluoro-17α-methyl-19-nor-5α-androstan-17β-ol-3,11-dione,
17α-methyl-$\Delta^1$-androstene-11β,17β-diol-3-one,
17α-ethyl-$\Delta^1$-androstene-11β,17β-diol-3-one,
17α-methyl-$\Delta^1$-androsten-17β-ol-3,11-dione,
17α-ethyl-$\Delta^1$-androsten-17β-ol-3,11-dione,
17α-methyltestosterone,
17α-ethinyltestosterone,
17α-(hex-1-yne-1-yl)testosterone,
2α,17α-dimethyltestosterone,
4α,17α-dimethyltestosterone,
6α-fluoro-17α-methallyltestosterone,
6β-methyl-17α-ethinyltestosterone,
4-chloro-6α-methyltestosterone,
4-chloro-17α-methyltestosterone,
4-chloro-6α,17α-dimethyltestosterone,
6α-fluoro-17α-methyltestosterone,
6α-fluoro-17α-methallyltestosterone,
11β-hydroxy-17α-methyltestosterone,
11-keto-17α-methyltestosterone,
2α,17α-dimethyl-11-ketotestosterone,
6α,17α-dimethyl-11β-hydroxytestosterone,
6α,17α-dimethyl-9α-fluoro-11-ketotestosterone,
9α-fluoro-11-keto-17α-methyltestosterone,
9α-chloro-11β-hydroxy-17α-methyltestosterone,
6α,9α-difluoro-11β-hydroxy-17α-methyltestosterone,
17α-methyl-19-nortestosterone,
17α-butyl-19-nortestosterone,
17α-(2-methallyl)-19-nortestosterone,
17α-ethinyl-19-nortestosterone,
17α-propynyl-19-nortestosterone,
1α,17α-dimethyl-19-nortestosterone,
1α-methyl-17α-ethinyl-19-nortestosterone,
6α-methyl-17α-ethyl-19-nortestosterone,
11β-hydroxy-17α-methyl-19-nortestosterone,
11β-hydroxy-17α-ethinyl-19-nortestosterone,
4-chloro-17α-methyl-19-nortestosterone,
17α-methyl-$\Delta^{1,4}$-androstadien-17β-ol-3-one,
17α-isopropenyl-$\Delta^{1,4}$-androstadien-17β-ol-3-one,
17α-ethinyl-$\Delta^{1,4}$-androstadien-17β-ol-3-one,
17α-ethinyl-$\Delta^{1,4}$-androstadiene-11β,17β-diol-3-one,
6α-fluoro-$\Delta^{1,4}$-androstadien-17β-ol-3-one,
6α-chloro-$\Delta^{1,4}$-androstadien-17β-ol-3-one,
17α-ethyl-19-nor-$\Delta^{4,6}$-androstadien-17β-ol-3-one,
17α-methyl-19-nor-$\Delta^{4,6}$-androstadiene-11β,17β-diol-3-one,
17α-ethyl-$\Delta^{1,4,6}$-androstatrien-17β-ol-3-one,
17α-methyl-$\Delta^{1,4,6}$-androstatriene-11β,17β-diol-3-one,
17α-ethinyl-$\Delta^{1,4,6}$-androstatrien-17β-ol-3,11-dione,
9α-fluoro-17α-methyl-$\Delta^{1,4,6}$-androstatrien-17β-ol-3,11-dione,
9α-fluoro-17α-ethinyl-$\Delta^{1,4,6}$-androstatriene-11β,17β-diol-3-one,
and the like.

In order that those skilled in the art can more fully understand the present invention, the following Examples are set forth. These examples are given solely for the purpose of illustration, and should not be considered as expressing limitations unless so set forth in the appended claims.

*Example I*

A mixture of 1 gram of testosterone, 2 cc. of dichloroacetyl chloride, 50 cc. of benzene and 1 cc. of pyridine, contained in a suitable reaction vessel, was allowed to react overnight at room temperature (about 25° C.). Following this reaction period, the reaction mixture was poured into a slurry of ice and water. The benzene layer was separated, washed with dilute aqueous hydrochloric acid, then with 5% aqueous sodium carbonate, and finally with water, and then evaporated to dryness. Crystallization of the dried residue from acetone-hexane gave testosterone 17-dichloroacetate in substantially quantitative yield.

The relative myotrophic and androgenic activities of testosterone 17-acetate, testosterone 17-propionate and testosterone 17-dichloroacetate were compared by means of standard tests on rats. The results of these tests are given in the following table.

TABLE I

| Ester | Relative Potency (Testosterone=100) | |
|---|---|---|
| | Anabolic | Androgenic |
| Acetate | 74 | 95 |
| Propionate | 151 | 154 |
| Dichloroacetate | 786 | 901 |

Examples II and III

The procedure employed in Example I was repeated in each of these examples in every detail but one, namley, dichloroacetyl chloride was replaced by difluoroacetyl chloride and fluoroacetyl chloride, respectively. Substantially quantitative yields of testosterone 17-difluoroacetate and testosterone-17-fluorochloroacetate, respectively, were obtained.

Examples IV–VI

By using 4-chlorotestosterone in place of testosterone in the procedure of Examples I, II and III the 17-dichloroacetate, 17-difluoroacetate and 17-fluorochloroacetate, respectively, of 4-chlorotestosterone were obtained in substantially quantitative yields.

Examples VII–IX

The procedure of Example I was again repeated in every detail in each of these examples with one exception, namely, testosterone was replaced by 2α-methyltestosterone, 2α-cyanotestosterone and 9α-fluoro-11β-hydroxytestosterone, respectively. Substantially quantitative yields of 2α-methyltestosterone 17-dichloroacetate, 2α-cyanotestosterone 17-dichloroacetate and 9α-fluoro-11β-hydroxytestosterone 17-dichloroacetate, respectively, were obtained.

Example X

To a solution of 5 grams of 17α-methyltestosterone in 250 cc. of benzene, contained in a suitable reaction vessel equipped with a reflux condenser and a distillation column for the removal of water formed during the reaction, there were added 10 grams of dichloroacetic acid and 1 gram of p-toluensulfonic acid. The resulting reaction mixture was refluxed for 12 hours, then poured into a slurry of ice and water. Next, the benzene layer was separated, washed with a 10% aqueous sodium carbonate solution and then with water, and evaporated to dryness. Crystallization of the resulting residue from diethyl ether-hexane gave 17α-methyltestosterone 17-dichloroacetate in substantially quantitative yield.

Example XI–XV

The procedure of Example X was repeated in each of these examples in every detail but one, namely, 17α-methyltestosterone was replaced by 17α-methylandrostan-17β-ol-3-one, 6α-fluoro-17α-methyltestosterone, 9α-fluoro-11β-hydroxy-17a-methyltestosterone, 4-chloro-17a-methyl-19-nor-testosterone and 17a-ethinyl-19-nor-testosterone, respectively, to give, in each case, the corresponding 17-dichloroacetate in substantially quantitative yield.

Example XVI

A reaction mixture consisting of 1 gram of 17α-methyltestosterone and 2 grams of difluoroacetyl chloride in 20 cc. of pyridine, contained in a suitable reaction vessel equipped with a reflux condenser, was refluxed for 15 hours. Following this reaction period the reaction mixture was poured into ice water and the precipitate formed there by was filtered, washed with water and dried. Crystallization of the dried precipitate from acetone-hexane gave 17α-methyltestosterone 17-difluoroacetate in substantially quantitative yield.

Example XVII

The procedure employed in Example XVI was repeated in every detail but one, namely, difluoroacetyl chloride was replaced by fluorochloroacetyl chloride. This resulted in a substantially quantative yield of 17α-methyltestosterone 17-fluorochloroacetate.

Examples XVIII–XX

By using 4-chloro-17α-methyltestosterone in place of 17α-methyltestosterone in the procedure of Example XVI, and by treating it successively with dichloroacetyl chloride, difluoroacetyl chloride and fluorochloroacetyl chloride, the 17-dichloroacetate, 17-difluoroacetate and 17-fluorochloroacetate, respectively, of 4-chloro-17α-methyltestosterone were obtained in substantially quantitative yields.

Examples XXI–XXIII

The procedure of Example XVI was again repeated in every detail in each of these examples except for the following. Instead of 17α-methyltestosterone, 2α,17α-dimethyltestosterone was employed as the starting material, and it was esterified successively with dichloroacetyl chloride, difluoro acetyl chloride and fluorochloroacetyl chloride. The resulting 17-dichloroacetyl, 17-difluoroacetyl and 17-fluorochloroacetyl esters of 2α,17α-dimethyltestosterone were obtained in substantially quantitative yields.

It will be obvious to those skilled in the art that other changes and variations can be made in carrying out the present invention without departing from the spirit and scope thereof as defined in the appended claims.

I claim:
1. 4-chlorotestosterone 17-dichloroacetate.
2. 4-chlorotestosterone 17-difluoroacetate.
3. 2α-methyltestosterone 17-dichloroacetate.
4. 2α-cyanotestosterone 17-dichloroacetate.
5. 9α-fluoro-11β-hydroxytestosterone 17-dichloroacetate.
6. 17α-methyltestosterone 17-dichloroacetate.
7. 17α-methylandrostan-17β-ol-3-one 17-dichloroacetate.
8. 6α-fluoro-17α-methyltestosterone 17-dichloroacetate.
9. 9α-fluoro-11β-hydroxy-17α-methyltestosterone 17-dichloroacetate.
10. 4-chloro-17α-methyl-19-nortestosterone 17-dichloroacetate.
11. 17α-ethinyl-19-nortestosterone 17-dichloroacetate.
12. 4-chloro-17α-methyltestosterone 17-dichloroacetate.
13. 2α,17α-dimethyltestosterone 17-dichloroacetate.
14. A compound of the formula:

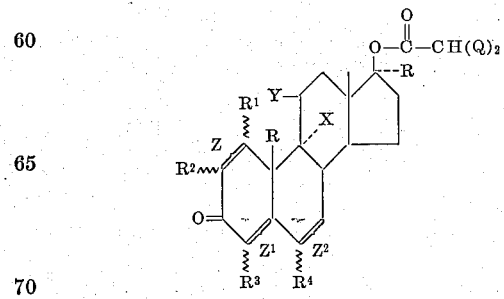

wherein each of R and $R^1$ is selected from the group consisting of hydrogen and methyl, $R^2$ is selected from the group consisting of hydrogen, methyl, and cyano; each of $R^3$ and $R^4$ is selected from the group consisting of hydrogen, methyl, fluoro and chloro; $R^5$ is selected from the group consisting of hydrogen, lower alkyl, lower alkenyl and lower alkynyl, at least one of $R^1$, $R^2$, $R^3$, $R^4$, and $R_5$ being a group other than hydrogen; X is selected from the group consisting of hydrogen, fluoro and chloro; Y is selected from the group consisting of hydrogen, β-hydroxy and keto, X being hydrogen when Y is hydrogen; each of Z, $Z^1$ and $Z^2$ is selected from the group consisting of a double bond and a saturated single bond between the carbon atoms at the 1- and 2-, 4- and 5-, and 6- and 7-positions respectively, and Q is a member selected from the group consisting of fluoro and chloro.

References Cited by the Examiner

UNITED STATES PATENTS 3,132,137    5/1964    Clinton _____ 260—239.5

OTHER REFERENCES

Farmitalia, "J.A.C.S.," vol. 78 (1956), p. 3540 relied on.

Knox et al., "Tetrahedron Letters," December 1962, pp. 1249–1255 relied on.

LEWIS GOTTS, *Primary Examiner.*

ELBERT L. ROBERTS, *Assistant Examiner.*